(12) United States Patent
Nielsen et al.

(10) Patent No.: US 11,168,662 B2
(45) Date of Patent: Nov. 9, 2021

(54) CONTROL METHOD FOR A WIND TURBINE (71) Applicant: VESTAS WIND SYSTEMS A/S, Aarhus N (DK)

(72) Inventors: Johnny Nielsen, Svenstrup J (DK); Brian Lembcke Melgaard, Skanderborg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 166 days.

(21) Appl. No.: 16/091,484

(22) PCT Filed: Apr. 6, 2017

(86) PCT No.: PCT/DK2017/050108
§ 371 (c)(1),
(2) Date: Oct. 4, 2018

(87) PCT Pub. No.: WO2017/178027
PCT Pub. Date: Oct. 19, 2017

(65) Prior Publication Data
US 2019/0153999 A1 May 23, 2019

(30) Foreign Application Priority Data
Apr. 13, 2016 (DK) .............................. PA201670224

(51) Int. Cl.
F03D 7/02 (2006.01)

(52) U.S. Cl.
CPC ........ F03D 7/0204 (2013.01); F05B 2270/32 (2013.01); F05B 2270/321 (2013.01);
(Continued)

(58) Field of Classification Search
CPC ................ F03D 7/0204; F05B 2270/32; F05B 2270/8042; F05B 2270/328; F05B 2270/329; F05B 2270/321; Y02E 10/723
See application file for complete search history.

(56) References Cited

U.S. PATENT DOCUMENTS 8,476,780 B2 * 7/2013 Hashimoto ........... F03D 7/0204
290/43
8,622,698 B2 * 1/2014 Kristoffersen ........ F03D 7/0224
290/44
(Continued)

FOREIGN PATENT DOCUMENTS

CN 101012809 A 8/2007
CN 101660492 A 3/2010
(Continued)

OTHER PUBLICATIONS

Written Opinion of the International Searching Authority for Application No. PCT/DK2017/050108, pp. 5.
(Continued)

Primary Examiner — Rocio Del Mar Perez-Velez
Assistant Examiner — Olvin Lopez Alvarez
(74) Attorney, Agent, or Firm — Patterson + Sheridan, LLP (57) ABSTRACT A control system for yawing a wind turbine rotor relative to the wind and for changing the pitch of rotor blades. A wind direction parameter is measured by a wind direction sensor. The wind direction is calibrated as a function of a predetermined offset parameter, and then adjusted as a function of a wind direction compensation parameter. The adjusted relative wind direction is then used in the determining of a control parameter of the wind turbine. The parameters for the calibration and adjustment of the relative wind direction are obtained from a set of data comprising the wind direction relative to the wind turbine over time and as measured by the wind direction sensor on the wind turbine and as measured by a second wind direction sensor.

19 Claims, 4 Drawing Sheets (52) U.S. Cl.
  CPC ... *F05B 2270/328* (2013.01); *F05B 2270/329* (2013.01); *F05B 2270/8042* (2013.01); *G05B 2219/2619* (2013.01); *Y02E 10/72* (2013.01)

(56) References Cited

U.S. PATENT DOCUMENTS

| | | | | |
|---|---|---|---|---|
| 8,928,164 | B2* | 1/2015 | Bowyer | F03D 7/0276 290/44 |
| 9,018,788 | B2* | 4/2015 | Bertolotti | F03D 7/042 290/55 |
| 9,982,656 | B2* | 5/2018 | Li | F03D 7/0204 |
| 2005/0169755 | A1 | 8/2005 | Yoshida | |
| 2007/0086893 | A1 | 4/2007 | Pedersen | |
| 2009/0261588 | A1* | 10/2009 | Von Mutius | F03D 7/0264 290/44 |
| 2010/0283246 | A1* | 11/2010 | Christensen | F03D 1/06 290/44 |
| 2012/0049520 | A1* | 3/2012 | Stiesdal | G01P 5/16 290/44 |
| 2013/0099497 | A1 | 4/2013 | Bowyer et al. | |
| 2013/0121825 | A1* | 5/2013 | Miranda | F03D 7/0224 416/1 |
| 2013/0166082 | A1* | 6/2013 | Ambekar | F03D 7/028 700/287 |
| 2014/0348650 | A1 | 11/2014 | Hansen | |
| 2017/0184073 | A1* | 6/2017 | Ruiz Aldama | F03D 7/0204 |
| 2017/0285066 | A1* | 10/2017 | Esbensen | F03D 7/0204 |
| 2018/0246138 | A1* | 8/2018 | Holtom | F03D 7/0224 |
| 2018/0355846 | A1* | 12/2018 | Nielsen | F03D 17/00 |

FOREIGN PATENT DOCUMENTS

| | | |
|---|---|---|
| EP | 2017468 A1 | 1/2009 |
| EP | 2154362 A1 | 2/2010 |
| EP | 2202407 A2 | 6/2010 |
| EP | 2840258 A1 | 2/2015 |
| JP | 2005054752 A | 3/2005 |
| WO | 2017178027 A1 | 10/2017 |

OTHER PUBLICATIONS

International Search Report for Application No. PCT/DK2017/050108 dated Jul. 18, 2017, pp. 3.

Danish 1st Technical Examination of Applicatoin No. PA 2016 70224 dated Jan. 10, 2017, pp. 5.

Chinese Office Action for Application No. 201780036385.9 dated Dec. 4, 2019, pp. 9.

* cited by examiner

CONTROL METHOD FOR A WIND TURBINE

FIELD OF THE INVENTION

The present invention relates to a method of controlling a wind turbine, the wind turbine comprising a wind direction sensor, a yawing system, and a control system for yawing the wind turbine rotor relative to the wind with the aim of controlling the wind turbine optimally under different and changing wind directions. The invention furthermore relates to control system for performing the control method and a wind turbine comprising such control system.

BACKGROUND

Most modern wind turbines are controlled and regulated continuously with the purpose of ensuring maximum power extraction from the wind under the current wind and weather conditions, while at the same time ensuring that the loads on the different components of the wind turbine are at any time kept within acceptable limits.

In order to optimize the power production and reduce the loads of the turbine it is important to know the right relative wind direction of the free flow wind. Most often the wind direction is measured by a wind direction sensor such as a wind vane placed on top of the nacelle and the wind turbine rotor is then continuously yawed to face the wind. If the wind direction measurements are off even by one or a few degrees, the resulting misalignment of the turbine rotor may cause increased and different loadings on the wind turbine blades than anticipated, and thereby increased wear and fatigue on the blades, blade root connections, bearings etc. Further, a misalignment of the turbine rotor causes a non-negligible reduction in the power production over time.

The measurements from a wind direction sensor may however far from always be accurate for one reason because the rotor disturbs the free flow wind before reaching the wind sensor.

One way to compensate for this problem is by calibrating the wind vane measurements by a basic set of offset parameters. These parameters are typically found on a prototype turbine by comparing the measurements from the wind sensors on the turbine with measurements from a nearby Met Mast. Hereby the wind vane is calibrated such that the wind vane detects a relative wind direction of 0 degrees when the nacelle is turned directly up against the wind.

However, it has surprisingly been found that a wind sensor calibrated in this way is still not always accurate in that the wind directions different from 0 degrees may still be measured inaccurately. In other words, the wind direction sensor may still show an error in the relative wind direction measurement when the wind turbine is not pointing directly upwind. Further, this error in the wind direction measurements has been seen to not simply be off by a constant value, but to be off by a value depending on the rotor operation (and thereby depending on the wind speed), and by a parameter depending on how and from where the wind passes the rotor.

For some turbines and seemingly occasioned by an increased rotor size, this error has been seen to be even more pronounced. In case the wind direction sensor measures too high values of the relative wind directions, such error may cause the wind turbine to yaw back and forth on either side of the actual wind direction. In addition to the non-optimal controlling of the wind turbine, such yawing causes highly increased wear on the yawing components in addition to the non-optimal positioning of the rotor in the wind.

OBJECT OF THE INVENTION

It is an object of embodiments of the present invention to provide a control method for a wind turbine which obviate or reduce some of the above mentioned problems in known controlling methods.

It is therefore an object of embodiments of the present invention to overcome or at least reduce some or all of the above described disadvantages of the known wind direction measurements by providing a wind turbine controlling method of improved yawing and reduced risk of misalignment of the wind turbine rotor.

It is a further object of the invention to provide a control method for a wind turbine increasing the annual energy production (AEP) of the wind turbine while preferably reducing the fatigue loading or wear on the turbine due to misalignment of the rotor in the wind or unnecessary yawing.

It is a further object of embodiments of the invention to provide a method of improving the wind direction measurements obtained by conventional wind direction sensors and to provide a method of calibrating measurements from a wind direction sensor which may be implemented on existing equipment.

So, in a first aspect the present invention relates to a method of controlling a wind turbine, the wind turbine comprising a wind direction sensor, a number of pitch-adjustable rotor blades, a yawing system, and a control system for yawing the wind turbine rotor relative to the wind and for changing the pitch of the rotor blades. The method comprises:

measuring a wind direction parameter by the wind direction sensor, wherein the wind direction parameter is indicative of the wind direction relative to the wind turbine;

calibrating the measured relative wind direction as a function of a predetermined offset parameter;

adjusting the calibrated relative wind direction as a function of a wind direction compensation parameter, wherein the wind direction compensation parameter depends on the calibrated relative wind direction;

determining a control parameter of the wind turbine as a function of the adjusted relative wind direction; and controlling the wind turbine according to the control parameter.

Hereby is obtained a simple yet effective control method improving the yawing of the wind turbine and reducing the risk of misaligning the rotor relative to the wind, as the yawing is based on both calibrated and adjusted wind direction measurements, where the calibration ensures the wind sensor detects a 0 degree relative wind direction when the rotor is pointing directly into the wind and where the following adjustment by the wind direction parameter ensures an accurate wind direction measurements when the wind is not coming directly in front.

Furthermore is obtained a simple and effective control method for increasing the performance such as the annual energy production (AEP), as the yawing is adjusted to obtain a better alignment of the rotor to the wind as actually experienced by the rotor. Also, the wind turbine is better protected as a more precise alignment of the rotor to the free wind generally results in better control of the loads on the wind turbine blades and reduced wear on components. Further, the improved accuracy of the wind direction measurements especially of wind directions at an angle to the rotor reduces the risk of overcompensating the yawing having the rotor yawing too much in each yaw step.

It has been found that the wind direction measurements used to determine the optimal orientation of the wind turbine can advantageously be adjusted based on firstly an offset parameter and secondly a wind direction compensation parameter according to the proposed method. The predetermined offset parameter corresponds to a standard or traditional calibration of the wind sensor adjusting the mean value of the measured wind direction so that the wind sensor yields the correct zero degree wind direction when the rotor is pointing directly upwind. The hereby calibrated relative wind direction is then further adjusted as a function of a wind direction compensation parameter which depends on the calibrated relative wind direction. Hereby is compensated for the error or inaccuracy of the relative wind direction measurement when the turbine is not pointing directly upwind and for the free wind flow having been changed by the rotor. In other words, the wind direction compensation parameter will adjust the deviation around the mean value as ensured by the calibration by the offset parameter. Because the wind direction compensation parameter depends on the calibrated relative wind direction is accounted for wind flow being changed by the rotor differently in dependence on its direction when hitting the rotor. The calibration and adjustment according to this method have proven to be a good and effective means for the reducing or compensating for the inherent inaccuracy of the wind direction sensor measurements primarily caused by the free flow of the wind being changed by the rotor.

The proposed control method wherein the measured wind parameter is both calibrated and adjusted has been seen to yield a more robust and stable control method where the risk of unintentional increased or more or less abrupt switching between different yaw positions has been significantly reduced or even removed. In this way, the earlier mentioned problem of switching between too large positive and negative yaw directions on either side of the wind direction, which has been seen to occur on some rotor types due to the rotor somehow affecting the wind flow to be measured at the wind sensor position as higher than the free wind, has been seen to be avoided. This effect is obtained because of the additional adjustment of the calibrated wind parameter taking into account the inaccuracy of the wind sensor measurements when the rotor is not pointing directly upwind and thereby how the rotor affects the wind flow.

The control parameter may preferably by a yaw parameter for the wind turbine and the controlling of the wind turbine then comprises yawing the wind turbine according to the yawing parameter. Hereby the yawing parameter of the turbine is based on more accurate wind direction data improving the control of the wind turbine.

The control parameter may alternatively or additionally comprise other control parameters which to some extend depends on the wind direction, such as a pitch parameter of one or more of the rotor blades, and/or a rotational speed of the rotor.

The offset parameter and/or the wind direction compensation parameter(s) may be pre-determined on the same or on another wind turbine and may have been determined individually for example over different time periods or in parallel. The parameters may have been established by comparative measurements of the wind direction on a wind turbine and on a nearby MET mast or another type of mast where the measurements are unaffected by a wind turbine rotor.

The offset parameter and/or the wind direction compensation parameter(s) may be parameters for the adjustment of the measured wind direction for example in dependence of the wind speed and/or other parameters such as the temperature, humidity, time of year, height etc. Some or all of the parameters for the calibration and/or adjustment of the wind direction may be given in one or more look-up table and/or as a functional expression of any one or more of these previously mentioned parameters of wind speed, temperature, humidity, time of year, height etc. Additionally, the wind direction compensation parameter may be given in a look-up table and/or as a functional expression of the calibrated wind direction.

The calibrating of the measured relative wind direction may be performed by an addition of the predetermined offset parameter. Alternatively, the calibration of the measured relative wind direction may be performed by a multiplication of the predetermined offset parameter or by another function.

The adjusting of the calibrated relative wind direction may be performed by an addition of the wind direction compensation parameter. Alternatively, the adjusting of the calibrated relative wind direction may be performed by a multiplication of the wind direction compensation parameter or by another functional relationship.

The control method may be implemented on new or existing wind turbines as pure software implementation with no need for any additional hardware on the turbine or may be implemented as a combination of software and hardware.

In an embodiment the method of controlling further comprises obtaining a set of data comprising the wind direction relative to the wind turbine over time and as measured by the wind direction sensor on the wind turbine and as measured by a second wind direction sensor. Hereby is obtained a reliable set of data from which can be extracted the information on how the rotor on the wind turbine affects the first wind direction sensor measurements by comparison to the wind direction measurements as obtained from the second wind direction sensor.

A data set of a measured relative wind directions may be averaged over a relatively short period of time such as e.g. 10-40 seconds to hereby reduce influence by turbulence etc. Preferably such averaging is performed over a period of time shorter than the time constant used for controlling the yawing of the wind turbine, such that the wind direction measurements are not affected or are not affected as much by any intermediate or overlapping yawing.

The data in the data set may be obtained at time intervals of fixed length such as every minute, a number of times every minute, every hour or every day. The data set is in an embodiment determined over a predetermined time period such as over one week or a preset number or days. The length of the time period may alternatively or additionally be set in dependence of other parameters such as for example the time of year, the general weather conditions. The data set may be obtained by measurements over one or more periods of time such as over a week, more weeks, or a month or longer, and may be obtained in periods of favourable or representative wind conditions under different operational modes of the wind turbine, different wind speeds, temperatures etc.

In an embodiment of the invention, the data set is determined based on a predetermined number of data points. Hereby is ensured that the offset parameter and the wind direction compensation parameter are obtained based on a sufficiently large number of data in order to ensure a sufficient or a certain desired quality. Further is ensured that the data set is based on a sufficient amount of data which under some weather conditions may take longer time to obtain or may under some weather conditions be obtained faster than expected.

In a further embodiment, the data set is determined based on at least a predetermined number of data points within at least one predetermined interval of the calibrated relative wind direction, such as in an interval of [(−15°)-(−10°)], [(−10°)-(−5°)], [(−5°)-(−1°)], [1°-5°], [5°-10°], and/or [10°-15°]. Hereby is ensured that the calibration and adjustment is performed on a certain amount of relevant data thereby increasing the quality of the method. The offset parameter may typically be around +/−10 degrees and therefore the data set may advantageously be based at least on a certain number of data of relative wind directions within one or more of intervals also within +/−10 degrees such as within one or more of the above mentioned intervals.

Preferably, the second wind direction sensor is positioned on a nearby MET mast and/or comprises a LIDAR sensor. The MET mast may be a metrological mast equipped with other metrological equipment and sensors or may be a simple mast or another wind turbine which is not operating or only partially operating or a where the second wind sensor is placed in such a way that is not or only minimally affected by the rotor, or where the wind measurements from the second wind sensor for one reason or another are reliable yielding a truer picture of the actual wind direction. By a nearby mast is to be understood that the mast is placed close enough for the second wind direction sensor to likely or plausibly measure the same or nearly the same wind direction as present at the wind turbine position. The second wind direction sensor may be placed within a radius of approximately 0.1-1 km. Alternatively or additionally the second wind sensor may comprise a LIDAR sensor. Hereby the need for a nearby mast for the placing of the second wind sensor can be obviated as the LIDAR sensor can be placed on the wind turbine to measure the wind characteristics in front of the rotor.

The set of data is in an embodiment based on earlier measurements on the same or on another wind turbine of the same type as the wind turbine where the control method is performed. In an embodiment the set of data is continuously or at times updated by further or new measurements. Such updated data may be obtained from measurements on the same wind turbine or from measurements performed on other wind turbines at the same or other sites.

In an embodiment, the predetermined offset parameter is determined as a mean error of the wind direction sensor measurements compared to the measurements by the second wind direction sensor. Hereby may by simple means be obtained an offset parameter for calibrating the wind sensor such that the wind sensor (when calibrated) correctly yields a wind direction of 0 degrees when the rotor is turned directly into the wind. Here, the wind direction measurements are preferably obtained over a relatively longer period of time and/or from a relatively large amount of data to thereby the mean error more accurately. Also, hereby is most likely obtained data over a wider range of wind directions. The data set may for example correspond to the data obtained over days or weeks of operating and at changing and different wind conditions.

In an embodiment of the method of controlling, the method comprises pre-setting a number of intervals of wind direction as measured by the first and/or second wind direction sensor, and for each wind direction interval determining a wind direction compensation parameter for that wind direction interval and based on the sub-set of data for that wind direction interval and from the difference between the first wind direction sensor measurements and the second wind direction sensor measurements in the sub-set of data. Hereby is obtained a wind direction compensation parameter as a function of the wind direction which parameter expresses the difference between the relative wind direction as measured and the actual relative wind direction. This embodiment corresponds to binning the data from the at least two wind sensors and finding the relationship between the measurements from the first sensor and the second. In this way the deviation of the wind sensor measurements around the mean value firstly calibrated by the offset parameter can be removed or at least reduced effectively.

As an example, the data where the second (or first) wind sensor measures the wind direction to be within an interval of for example 2-5 degrees are extracted from the data set and are then compared to the corresponding measurements obtained from the first (or second) wind sensor. If these data show a general difference of say 2 degrees between the measurements of the first and the second wind sensor, then the wind direction compensation parameter for this interval can be expressed as a constant of two degrees which needs to be added to the calibrated wind direction (when the calibrated wind direction is within the interval of 2-5 degrees) in order to yield the adjusted and more accurate wind direction. The wind direction compensation parameter for this example may alternatively be expressed as a gain factor of approximately 1.5.

The wind direction compensation parameter may be determined as one parameter, or as a number of parameters (for example one for each or each 0.5 degree of wind direction), or by a function within each wind direction interval.

The wind direction compensation parameter determined from the difference between the first wind direction sensor measurements and the second wind direction sensor measurements in the sub-set of data may in one embodiment be determined as the difference between the mean values of the wind direction measurements.

In an embodiment of the method of controlling, the method comprises pre-setting a number of intervals of wind direction as measured by the first and/or second wind direction sensor, and for each wind direction interval determining a wind direction compensation parameter for that wind direction interval and based on the sub-set of data for that wind direction interval, by determining a first distribution function of the first wind direction sensor measurements in the sub-set of data, determining a second distribution function of the second wind direction sensor measurements in the sub-set of data, and comparing the first and second distribution functions. The distribution functions may for example be a normal distribution around a mean value or may be other kinds of distributions. Hereby the wind direction compensation parameters can be determined which when applied on the calibrated wind direction will result in an adjusted wind direction corresponding more closely and accurately to the actual wind direction of the free flow.

In embodiments of the invention, the wind direction compensation parameter is determined as an offset value and/or a gain factor. Hereby the calibrated relative wind direction can be easily adjusted by the addition/subtraction of the offset value or alternatively or additionally by the multiplication of the gain factor.

In embodiments of the invention, the set of data further comprises a measurement and/or an estimate of a wind speed at the time of measurement. The predetermined offset parameter and/or the wind direction compensation parameter can then depend on the wind speed. Hereby is obtained that the wind direction calibration and wind direction adjustment take into account that the rotor may operate differently or be configured differently (for example by other pitch angles) at different wind speeds and that the free wind therefore may be affected differently by the passing of the rotor at different wind speeds. By taking into account the wind speed, the accuracy of the control method according to the invention is thereby improved considerably.

The wind speed may be measured by a wind speed sensor such as an anemometer or a LIDAR sensor. Alternatively or additionally the wind speed may be estimated.

The offset parameter and wind direction compensation parameter have been found to be determined more precisely and be more accurate when an estimated wind speed is used compared to measured wind speeds. The estimated wind speeds have proven to yield more accurate results because the measured wind speed is relatively more inaccurate and varying relatively much with any yaw error.

In an embodiment of the invention, the method further comprises pre-setting a number of intervals of wind speed, and determining an offset parameter and/or a wind direction compensation parameter for each wind speed interval based on the obtained data for that wind speed interval. In an embodiment, 2, 3, 4, 5, 6, 7, or 8 different wind speed intervals are set based on estimated wind speeds within 2, 3, 4, 5, 6, 7, or 8 wind speed intervals, respectively, and such as for example for wind speed intervals of 3-8 m/s, 8-13 m/s, 13-20 m/s, 20-30 m/s and/or 30-40 m/s.

When performing the control method, a wind speed is measured and the relative wind direction adjusting as a function of the wind direction compensation parameter determined for the wind speed interval comprising the wind speed at the time of adjusting. In an embodiment the relative wind direction is adjusted by using an interpolation between the wind direction compensation parameters of the different wind speed intervals.

The subset of data for different wind speed intervals or wind speed bins may be determined individually for example over different time periods or in parallel. One subset of data for one wind speed interval may be ready and applicable earlier than the others depending on the wind conditions.

In a further aspect the present invention relates to a control system for a wind turbine configured to perform the steps of:
  receiving a wind direction parameter as measured by a wind direction sensor, wherein the wind direction parameter is indicative of the wind direction relative to the wind turbine;
  calibrating the measured relative wind direction as a function of a predetermined offset parameter;
  adjusting the calibrated relative wind direction as a function of a wind direction compensation parameter, wherein the wind direction compensation parameter depends on the calibrated relative wind direction;
  determining a control parameter of the wind turbine as a function of the adjusted wind parameter; and
  controlling the wind turbine according to the control parameter.

In a further aspect the present invention relates to a wind turbine comprising a wind sensor, a yawing system, and a control system according to the above for yawing the wind turbine rotor relative to the wind.

The advantages of the control system and the wind turbine comprising such control system are as described in relation to the control method in the previous.

BRIEF DESCRIPTION OF THE DRAWINGS

In the following different embodiments of the invention will be described with reference to the drawings, wherein.

DETAILED DESCRIPTION OF THE DRAWINGS

Figure 1:
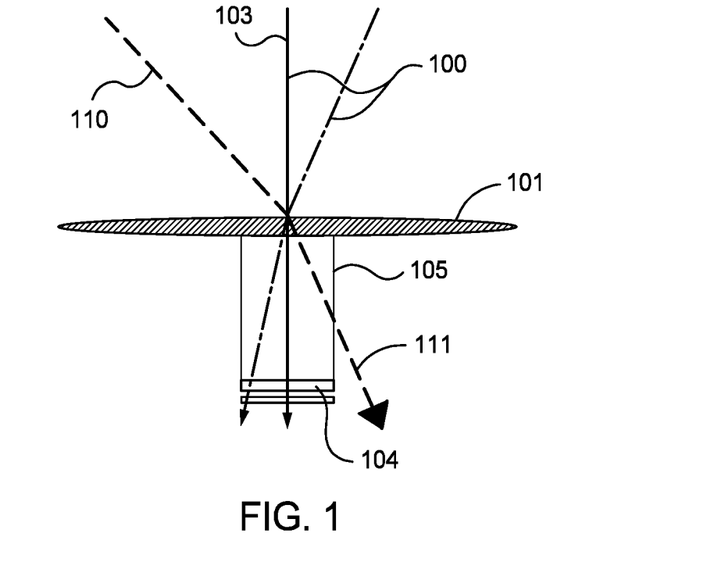
FIG. 1 illustrates the change in wind direction when the free flow passes through a wind turbine rotor.

FIG. 1 illustrates the change in wind direction when the free flow 100 passes through a wind turbine rotor 101. If the rotor 101 is turned directly in to the wind as illustrated by the solid black line 103, a wind direction sensor 104 positioned on the nacelle 105 behind the rotor 101 when calibrated will measure a wind direction of 0 degrees. However, if the wind is not directly upwind the wind flow 100 is affected by the rotor 101 and is affected differently depending on the direction of the incoming wind. Therefore, the wind sensor 104 may detect the wind direction inaccurately. The figure illustrates how an incoming wind at approximately 45 degrees, 110, may be measured as being only 30 degrees, 111, even though the wind sensor has been calibrated.

Figure 2:
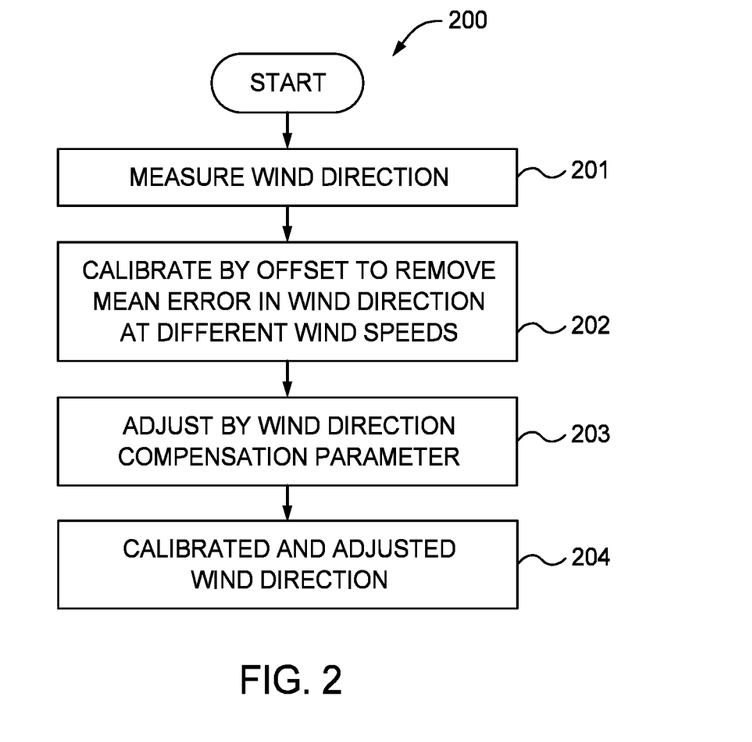
FIG. 2 is a flow chart illustrating an embodiment of the invention.

FIG. 2 shows a flow chart illustrating the method steps performed in a control system, 200, of a wind turbine according to the invention. The control method comprises measuring a direction of the wind relative to the wind turbine by means of a wind direction sensor, 201. Then the relative wind direction as measured by the wind direction sensor is first calibrated by a predetermined offset parameter as conventionally done, 202. Hereby, the wind direction sensor is calibrated so as to yield a calibrated relative wind direction of 0 degrees when the rotor is turned directly upwind.

However, it has been observed that the calibrated wind sensor shows an error in its relative wind direction measurements when the wind turbine is not pointing directly upwind. In many cases the wind sensors have been found to yield relative wind directions smaller than the actual relative wind direction. In such cases, the inaccuracy of the wind sensor reported here may not be noticed as this could result in the wind turbine being yawed less than optimal and the wind turbine needing more yawing steps to be turned into the wind. It can however also result in, that a bigger yaw error is required before starting yawing upwind, and even worse that an extreme yaw error event may not be detected. For instance if the wind is suddenly changing 30 degrees some pitching of the blades is needed to minimize the loads. But if only 20 degrees are measured, the load reduction activities would not be initiated on the event.

In some case and for some rotor types, the rotor has been seen to affect the wind flow in such a way that the wind sensors yield relative wind directions larger than the actual relative wind direction. This may however be critical to the controlling of the wind turbine and lead to critical loads and wear especially on the yawing system, as the control system may then tend to yaw the rotor too much and causing the rotor to be yawed back and forth without obtaining the desired yaw direction of the rotor pointing directly into the wind.

This inaccuracy of the wind sensor measurements is removed by the method according to the invention by adjusting the already calibrated relative wind direction by a wind direction compensation parameter as illustrated in step 203 in FIG. 2. The wind direction compensation parameter depends on the calibrated relative wind direction. Hereby is obtained a calibrated and adjusted relative wind direction, which is then used in the control of the wind turbine.

Figure 7:
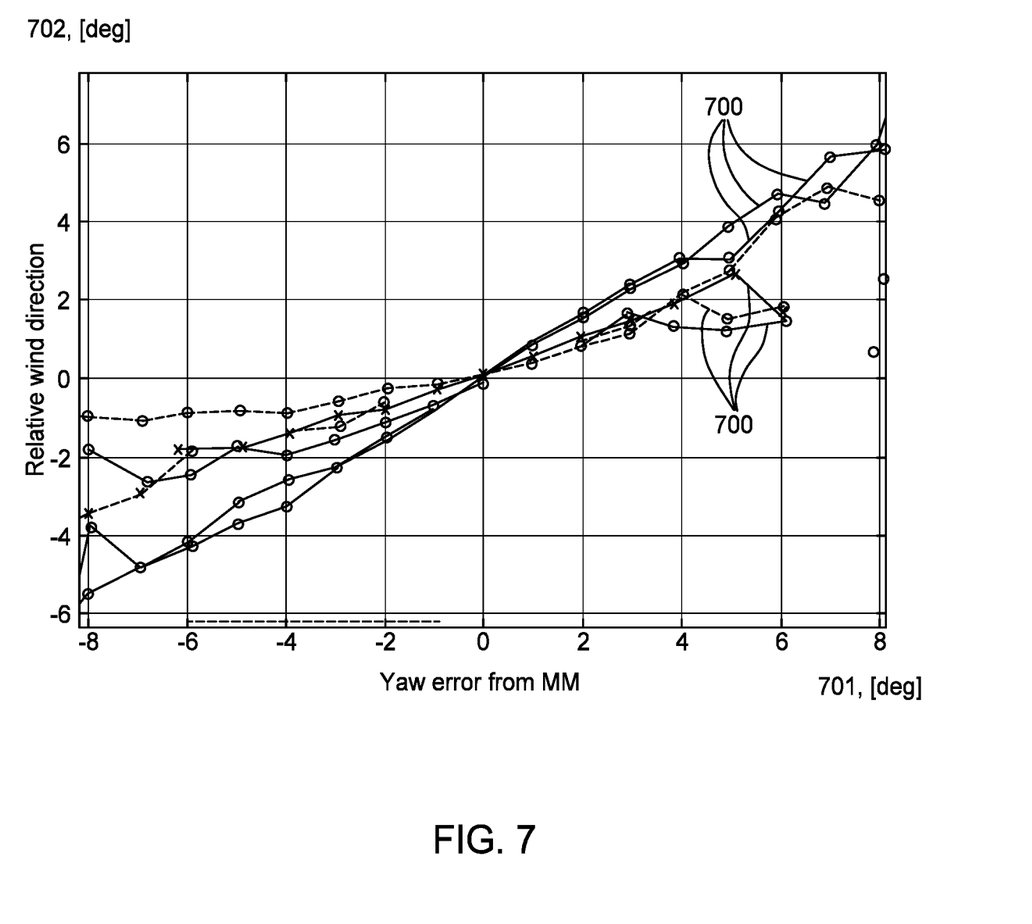

The wind direction compensation parameter is determined from a data set of measurements of the relative wind direction as measured by a wind sensor on a wind turbine and by a wind sensor preferably on a nearby MET mast. The different curves 700 in FIG. 7 show such data for a number of different wind turbines. Here, the relative wind direction as measured on a second wind sensor on a nearby MET mast, 701 is plotted versus the relative wind direction as measured and calibrated from the first wind sensor on the wind turbine, 702. Due to the initial calibration by the offset parameter, the first wind sensor yields a relative wind direction of 0 degrees in accordance with the 0 degrees also measured by the second wind sensor on he MET mast (i.e. all the curves 700 go through the point of (0,0)). All wind sensors of the wind turbine as shown in FIG. 7 generally yield too small wind directions. However, this is not always the case and as mentioned previously, some wind turbine sensors have been seen to detect larger wind directions than the actual wind directions.

Figure 3:
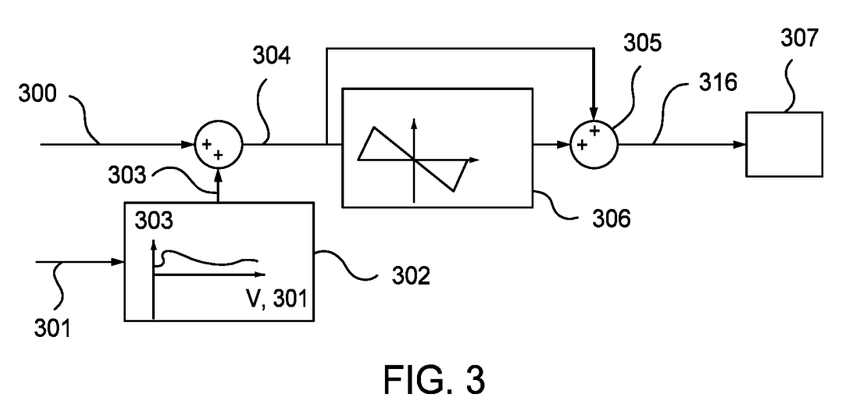
FIGS. 3 and 4 illustrate the calibration and adjustment of the measured wind direction according to embodiments of the invention.
Figure 4:
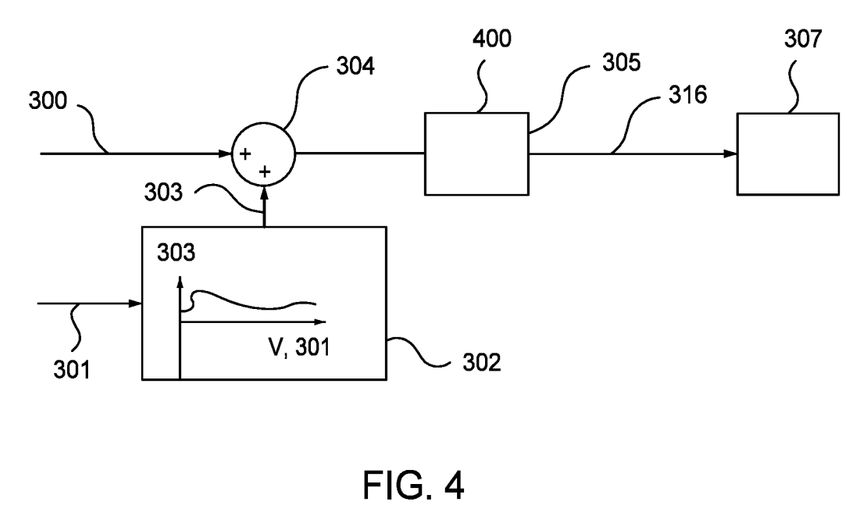

FIGS. 3 and 4 illustrate the calibration and adjustment of the raw measured wind direction data 300 according to two different embodiments of the invention and in more detail. A wind speed V, 301 is measured and/or estimated and an offset parameter 303 for that wind speed is obtained, 302. The offset parameter may be given as a pre-defined look-up table or set of offset parameters 303, preferably expressing the offset parameter as a function of the wind speed V, 301. So, based on the wind speed determination 301, the measured relative wind direction 300 is then calibrated 304 by the addition of the offset parameter 303 corresponding to that wind speed. Then the calibrated relative wind direction is adjusted 305 as a function of a wind direction compensation parameter 306 to yield a calibrated and adjusted wind direction 316 which is then used in the controller, 307. The wind direction compensation parameter 306 itself depends on the calibrated wind direction 304. The wind direction compensation parameter may further and preferably depend on the wind speed V, 301.

In the method of FIG. 3, the adjustment of the calibrated wind direction by means of the wind direction compensation parameter is performed by adding the wind direction compensation parameter as an offset value. In the method of FIG. 4, the wind direction compensation parameter is given as a gain factor, 400.

Figure 5:
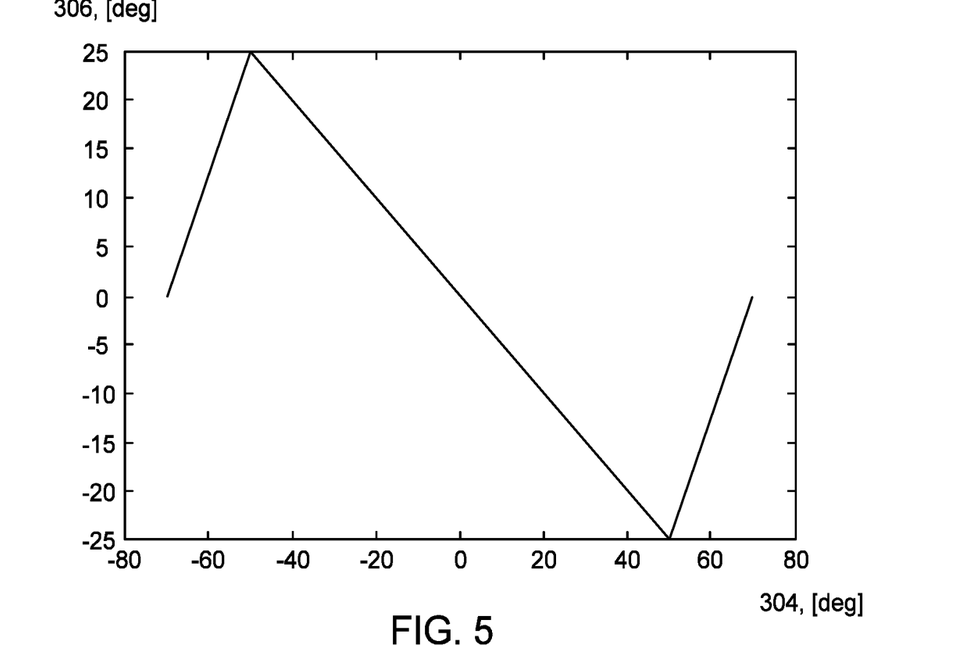
FIGS. 5 and 6 show examples of wind direction compensation parameters for two different wind speed intervals and according to embodiments of the invention, and
  FIG. 7 show examples of the calibrated measured relative wind direction versus relative wind direction measured from a nearby MET mast and for different types of wind turbines.
Figure 6:
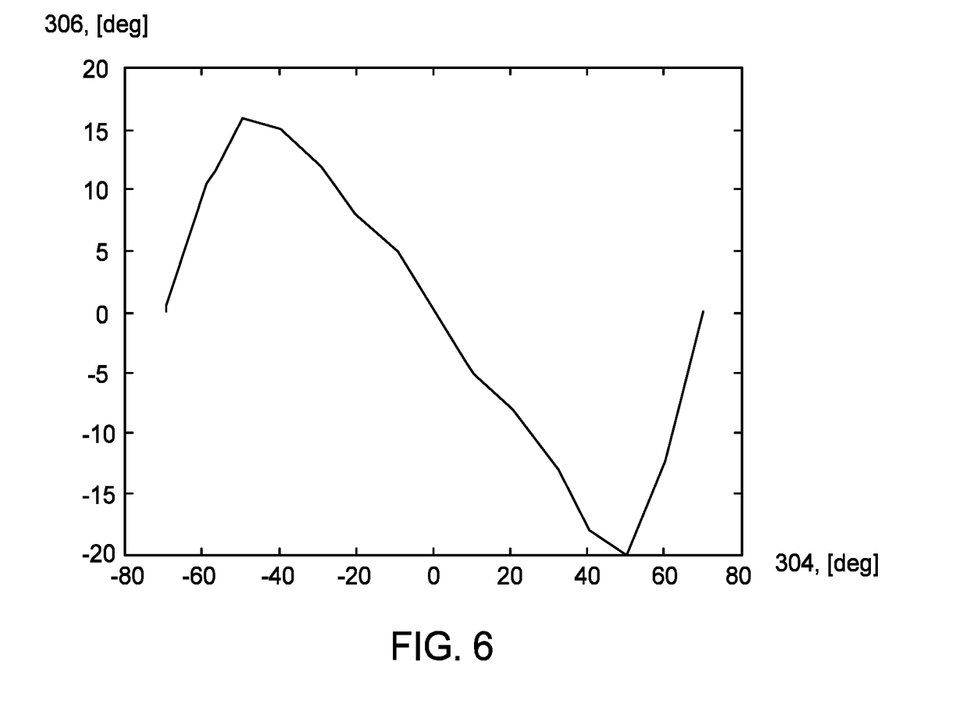

In FIGS. 5 and 6 are shown examples of wind direction compensation parameters 306 for two different wind speed intervals. The wind direction compensation parameter 306 of the wind speed interval or range as shown in FIG. 5 is seen to be given approximately by a piecewise linear function of the measured (and calibrated) relative wind direction, 304. Although the general shapes of the sets of wind direction compensation parameters 306 for the two different wind speeds in FIGS. 5 and 6, respectively, appear to have some similarities, the wind direction parameter function for wind speeds in the wind speed interval of FIG. 5 is seen to show more extreme values than of FIG. 6. In other words, the wind sensor measurements when the wind speed is in the wind speed interval of FIG. 5 are more off and need to be adjusted by larger parameters than when the wind speed is in the wind speed interval of FIG. 6.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A method of controlling a wind turbine, the wind turbine comprising a wind direction sensor, a number of pitch-adjustable rotor blades, a yawing system, and a control system for yawing a rotor of the wind turbine and for changing a pitch of the rotor blades, the method comprising:
   pre-setting a plurality of wind direction intervals;
   determining a wind direction compensation parameter for each wind direction interval of the plurality of wind direction intervals;
   measuring a wind direction relative to the wind turbine by the wind direction sensor;
   calibrating the wind direction as a function of a predetermined offset parameter to produce a calibrated wind direction;
   determining a wind direction interval of the plurality of wind direction intervals that includes the calibrated wind direction;
   adjusting the calibrated wind direction based on the wind direction compensation parameter of the wind direction interval to produce an adjusted wind direction;
   determining a control parameter comprising a yaw angle of the wind turbine as a function of the adjusted wind direction; and
   controlling the wind turbine according to the control parameter, wherein controlling the wind turbine comprises yawing the wind turbine according to the yaw angle.

2. The method of controlling according to claim 1 further comprising obtaining a set of data comprising the wind direction relative to the wind turbine over time as measured by the wind direction sensor and as measured by a second wind direction sensor.

3. The method of controlling according to claim 2, wherein the second wind direction sensor is positioned on a nearby MET mast or comprises a LIDAR sensor.

4. The method of controlling according to claim 2, wherein the predetermined offset parameter is determined as a mean error of measurements of the wind direction sensor compared to measurements by the second wind direction sensor.

5. The method of controlling according to claim 2, wherein:
   the wind direction compensation parameter for each wind direction interval of the plurality of wind direction intervals is based on a difference between measurements of the wind direction sensor and measurements of the second wind direction sensor in that wind direction interval.

6. The method of controlling according to claim 2, comprising:
   for each wind direction interval of the plurality of wind direction intervals, determining a first distribution function of measurements of the wind direction sensor in that wind direction interval, determining a second distribution function of measurements of the second wind direction sensor in that wind direction interval, and comparing the first and second distribution functions.

7. The method of controlling according to claim 2, wherein the set of data further comprises a measurement or an estimate of a wind speed at a time of measurement.

8. The method of controlling according to claim 7, further comprising pre-setting a number of intervals of wind speed, and determining an offset parameter or a wind direction compensation parameter for each wind speed interval based on data of the set of data for that wind speed interval.

9. The method of controlling according to claim 8 further comprising measuring a second wind speed and adjusting the wind direction relative to the wind turbine as a function of the wind direction compensation parameter determined for the wind speed interval comprising the second wind speed at the time of adjusting.

10. The method of controlling according to claim 8 further comprising measuring a second wind speed and adjusting the wind direction relative to the wind turbine by using an interpolation between wind direction compensation parameters of the intervals of wind speed.

11. The method of controlling according to claim 2, wherein the predetermined offset parameter or the wind direction compensation parameter depend on wind speed.

12. The method of controlling according to claim 1, wherein the wind direction compensation parameter is determined as an offset value or a gain factor.

13. The method of controlling according to claim 1, where the control parameter comprises a pitch parameter of one or more of the rotor blades and the controlling of the wind turbine comprises pitching one or more of the rotor blades according to the pitch parameter.

14. A control system for a wind turbine, comprising:
an input/out (I/O) interface configured to communicate with the wind turbine;
a memory configured to contain instructions; and
a processor communicatively coupled to the I/O interface and, and configured to execute the instructions to perform an operation comprising:
pre-setting a plurality of wind direction intervals;
determining a wind direction compensation parameter for each wind direction interval of the plurality of wind direction intervals;
receiving a wind direction relative to the wind turbine measured by a wind direction sensor;
calibrating the wind direction as a function of a predetermined offset parameter to produce a calibrated wind direction;
determining a wind direction interval of the plurality of wind direction intervals that includes the calibrated wind direction;
adjusting the calibrated wind direction based on the wind direction compensation parameter of the wind direction interval to produce an adjusted wind direction;
determining a control parameter comprising a yaw angle of the wind turbine as a function of the adjusted wind direction; and
controlling the wind turbine according to the control parameter, wherein controlling the wind turbine comprises yawing the wind turbine according to the yaw angle.

15. The control system of claim 14 wherein the operation further comprises obtaining a set of data comprising the wind direction relative to the wind turbine over time as measured by the wind direction sensor and as measured by a second wind direction sensor.

16. The control system of claim 15, wherein the second wind direction sensor is positioned on a nearby METmast or comprises a LIDAR sensor.

17. The control system of claim 15, wherein the predetermined offset parameter is determined as a mean error of measurements of the wind direction sensor compared to measurements by the second wind direction sensor.

18. A wind turbine, comprising:
a wind sensor,
a yawing system, and
a control system configured to yaw a rotor of the wind turbine by performing an operation comprising:
pre-setting a plurality of wind direction intervals;
determining a wind direction compensation parameter for each wind direction interval of the plurality of wind direction intervals;
receiving a wind direction relative to the wind turbine as measured by the wind sensor;
calibrating the wind direction as a function of a predetermined offset parameter to produce a calibrated wind direction;
determining a wind direction interval of the plurality of wind direction intervals that includes the calibrated wind direction;
adjusting the calibrated wind direction based on the wind direction compensation parameter of the wind direction interval to produce an adjusted wind direction;
determining a control parameter comprising a yaw angle of the wind turbine as a function of the adjusted wind direction; and
controlling the wind turbine according to the control parameter, wherein controlling the wind turbine comprises yawing the wind turbine according to the yaw angle.

19. The wind turbine of claim 18, wherein the operation further comprises obtaining a set of data comprising the wind direction relative to the wind turbine over time as measured by the wind sensor on the wind turbine and as measured by a second wind sensor.

* * * * *